(12) United States Patent
Nakaya

(10) Patent No.: US 6,915,997 B2
(45) Date of Patent: Jul. 12, 2005

(54) CUP HOLDING DEVICE

(75) Inventor: Hiroyuki Nakaya, Utsunomiya (JP)

(73) Assignee: Nifco Inc., Yokohama (JP)

( * ) Notice: Subject to any disclaimer, the term of this patent is extended or adjusted under 35 U.S.C. 154(b) by 191 days.

(21) Appl. No.: 10/349,912

(22) Filed: Jan. 24, 2003

(65) Prior Publication Data
US 2003/0155476 A1 Aug. 21, 2003

(30) Foreign Application Priority Data

Feb. 15, 2002 (JP) ........................................ 2002-038567

(51) Int. Cl.⁷ ................................................. B60N 3/10
(52) U.S. Cl. ................................... 248/311.2; 224/926
(58) Field of Search ............................. 248/311.2, 314, 248/523, 524, 525, 526; 16/386, 262, 263; 224/926; 297/188.14, 188.15, 188.16, 188.17

(56) References Cited

U.S. PATENT DOCUMENTS 770,595 A * 9/1904 Lovette ........................ 16/260
6,409,136 B1 * 6/2002 Weiss et al. .............. 248/311.2
6,572,069 B1 * 6/2003 Kotthaus ....................... 248/523
6,749,167 B2 * 6/2004 Kaupp et al. ............. 248/311.2
6,779,769 B1 * 8/2004 York et al. ................ 248/311.2

FOREIGN PATENT DOCUMENTS

JP          410291436 A  *  11/1998

* cited by examiner

Primary Examiner—Jonathon Szumny
(74) Attorney, Agent, or Firm—Manabu Kanesaka

(57) ABSTRACT

A cup holding device includes a holding main frame provided with vertical inserting holes, a holding member rotatably assembled to the holding main frame through engagements between axles and axle holes, and an urging spring for rotatably urging the holding member. The axles are disposed on the holding main frame with a space therebetween. A section of each axle has a non-circular shape. The axle holes are provided on the holding member corresponding to the respective axles. Each axle hole includes an introducing opening, and an engaging hole portion for preventing the axle from coming out by receiving the axle through the opening and rotating the holding member by a predetermined angle.

6 Claims, 4 Drawing Sheets

Fig. 4(a)
Fig. 4(b)
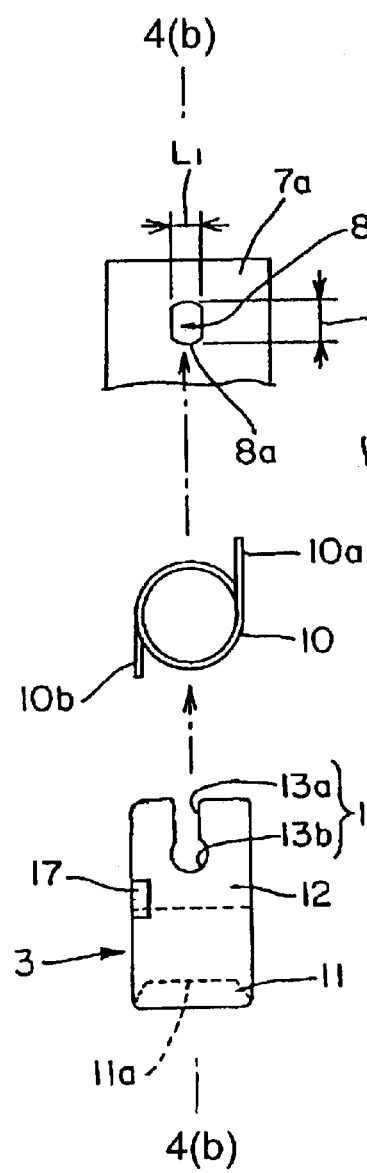
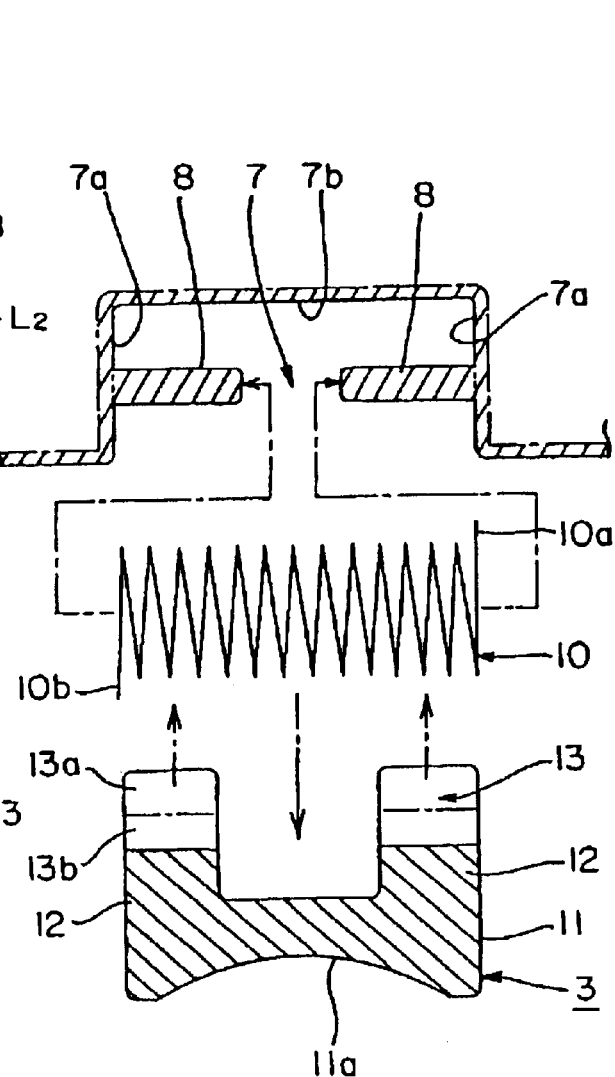

CUP HOLDING DEVICE

BACKGROUND OF THE INVENTION AND RELATED ART STATEMENT

The invention relates to a cup holding device to be equipped in a compartment of an automobile or the like for holding a beverage container, such as a can, a cup, and a PET bottle.

FIG. 5 schematically shows a conventional cup holding device 50 disposed to a portion of an instrument panel 40 in a compartment of an automobile. The device is structured such that a holding main fame 51 is provided with vertical inserting holes 55, and holding members 52 are rotatably assembled to the holding main fame 51 through an engagement between an axle S and axle holes 56a. Each of the holding members 52 is rotatably urged in one direction by an urging device 59, so that a container inserted into the vertical inserting hole 55 is supported in a container diameter direction to thereby stably be held.

A pair of the vertical inserting holes 55 is provided parallel on a flat plate 53 with a partition wall 55a therebetween, and each of the vertical inserting holes 55 is provided with a continued notch portion 56 on one side thereof. The holding member 52 is attached to the notch portion 56. Through holes 56a are formed at side surfaces opposite to the notch portion 56 on a coaxial line. Rotation restricting steps 56b are formed on an inner wall portion. A front portion 57 of each holding member 52 abuts against a side surface of a container, and attaching base portions 58 project at both rear sides thereof. Each attaching base portion 58 is provided with a through axle hole 58a and a projection 58b corresponding to the step portion 56b.

In the above-described structure, as shown in FIG. 5, each holding member 52 is positioned relative to the corresponding notch portion 56 in a state that a coil spring as the urging device 59 is disposed between the both base portions 58. The axle S is inserted through a hole 56a on one vertical inserting hole side, an axle hole 58a on one holding member side, a hole 56a on the other vertical inserting hole side, and an axle hole 58a on the other holding member side. The axle S is a long shaft with both ends provided with E-rings or the like to prevent the shaft from coming out. In an assembled state, the holding member 52 is supported horizontally by an urging force of the urging device 59. When a container is inserted into the vertical inserting hole 55, the holding member 52 is rotated downward against the urging force of the urging device 59, abuts against the side surface of the container in an inclined state according to an outer diameter of the container, and pushes the container in a radial direction thereof to thereby hold the container against an opposite side surface.

In the above structure, although the containers with different outer diameters can be stably held, there are the following problems in order to reduce a production cost. First, with the structure, the axle S has to be inserted from the outer side in a state where each holding member 52 and the urging device 59 are disposed in the notch portion 56. Also, the end portions of the axle S are required to be provided with the E-rings or the like to prevent the axle S from coming off. Thus, not only a large number of the parts are required, but also it takes a long time to assemble the urging device 59, resulting in poor assembly workability and a higher cost. Incidentally, an exclusive axle may support each of the holding members 52. In that case, however, the number of parts is further increased.

Since the main components are formed of a molded resin, the axle may be formed integrally with the holding main frame and the holding members to reduce the number of the parts. However, in that case, since the holding members 52 are disposed in the notch portions 56 of the holding main frame 51, for example, when the axle S is integrally formed on the side of the holding main frame, the axle can not be engaged with the axle hole on the side of the holding member 52 unless the holding member 52 is disposed with a play with respect to the notch 56.

In view of the above problems, the present invention has been made and an object of the invention is to provide a cup holding device, wherein the number of parts is reduced with a simple configuration, and assembly workability of the device is improved, thereby reducing a production cost.

Further objects and advantages of the invention will be apparent from the following description of the invention.

SUMMARY OF THE INVENTION

According to the present invention, a cup holding device includes a holding main frame having vertical inserting holes; holding members rotatably assembled to the holding main frame through engagements between axles and axle holes; and urging springs for rotatably urging the holding members so that the holding members hold containers in a radial direction. In the above-described device, the axles are disposed in a pair on a side of the holding main frame with a space therebetween, and have a non-circular section. The axle holes are disposed on a side of the holding member at positions corresponding to the respective axles. Each of the axle holes includes an introducing opening for inserting the axle therein in a specific direction, and an engaging hole portion for receiving the axle therein through the introducing opening by rotating the holding member by a predetermined angle to thereby prevent the axle from coming off.

In the above-described structure, the holding main frame is a type having the vertical inserting holes and the rotatably urging-type holding members for supporting the side surfaces of the containers inserted in the vertical inserting holes in the radial direction. Even in a case that the axles are formed in a shape projecting from the holding main frame, the axles can be rotatably engaged with the axle holes disposed on the sides of the holding member without coming out therefrom.

More specifically, two axles face each other on a coaxial line on the side of the holding main frame, and each axle has a non-circular section (for example, substantially D shape or I shape). Each of the axle holes includes the introducing opening disposed on the side of the holding member to allow the axle to enter therein from a specific direction, and the engaging hole portion for preventing the axle from coming out by receiving the axle through the introducing opening and rotating the holding member by a predetermined angle.

In an assembly process, each of the axles on the side of the holding main frame is positioned to face the corresponding opening of the holding member side hole by directing the holding member, and the axle is inserted into the engaging hole portion through the opening. Then, when the holding member is rotated by a predetermined angle, the axle will not move from the engaging hole portion to the opening, so that the holding member can be rotatably attached through the engagement between the axle and the axle hole. Therefore, in the present invention, an exclusive axle, which is required in the conventional device, is eliminated, thereby reducing the number of the parts. Incidentally, both the holding main frame and holding member are molded resin products. The axles may be integrally formed with the holding main frame and the axle holes may be integrally formed with the holding member.

The present invention may be modified according to the second and third aspects thereof. The holding member may include a front end abutting against the container side surface and base portions projecting backward from both sides of the front end on which the axle holes are formed. The urging spring is disposed between both base portions in a state where the axles are engaged with the axle holes, respectively. In the assembly process, the axles hold the urging spring in advance, and then the axles engage the axle holes, thereby improving the assembly workability.

Further, the holding member may be positioned in the vertical inserting hole so that the holding member can rotate downward by a predetermined angle from a substantially horizontal position. The axles rotate from a state where each axle engages the engaging hole portion through the introducing opening to the horizontal position side, so that the axles do not come out from the engaging hole portions, thereby simplifying the assembly process as opposed to that of the conventional device.

BRIEF DESCRIPTION OF THE DRAWINGS

FIGS. 4(a) and 4(b) are views showing essential parts of the device, wherein FIG. 4(a) is a schematic view showing the essential parts and an assembly process of the device, and FIG. 4(b) is a sectional view taken along line 4(b)–4(b) in FIG. 4(a)

DETAILED DESCRIPTION OF PREFERRED EMBODIMENTS

Figure 1:
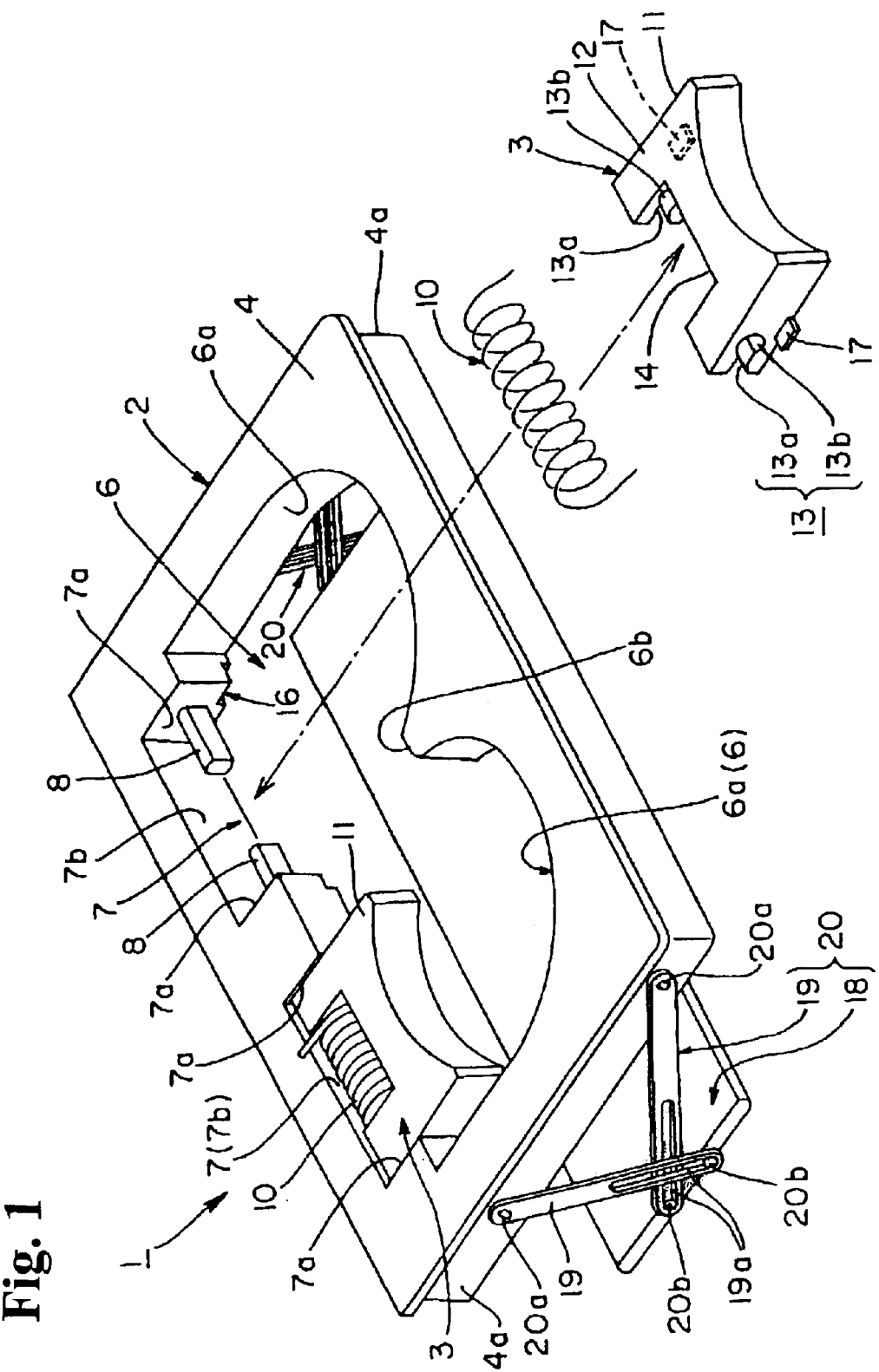
FIG. 1 is a partially exploded perspective view showing an appearance of a device according to the present invention.
Figure 2:
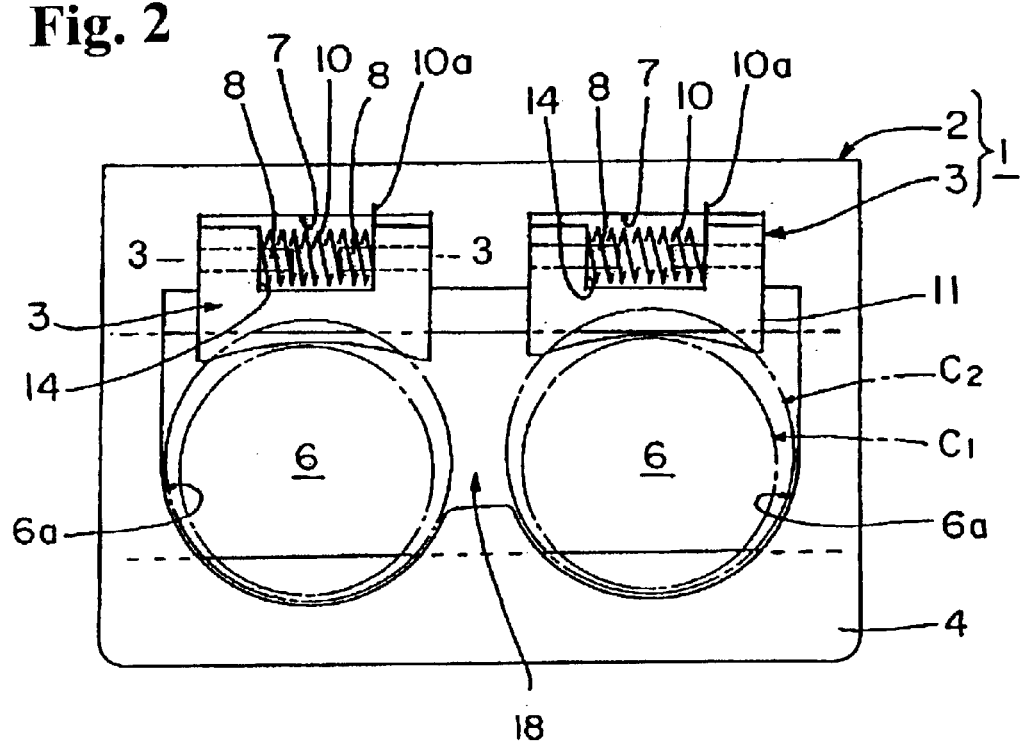
FIG. 2 is a plan view showing the device shown in FIG. 1 viewed from above.
Figure 3:
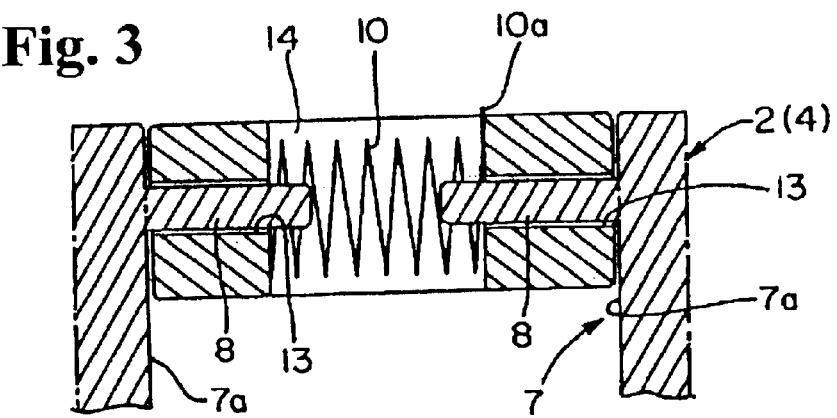
FIG. 3 is a sectional view taken along line 3—3 in FIG. 2.
Figure 5:
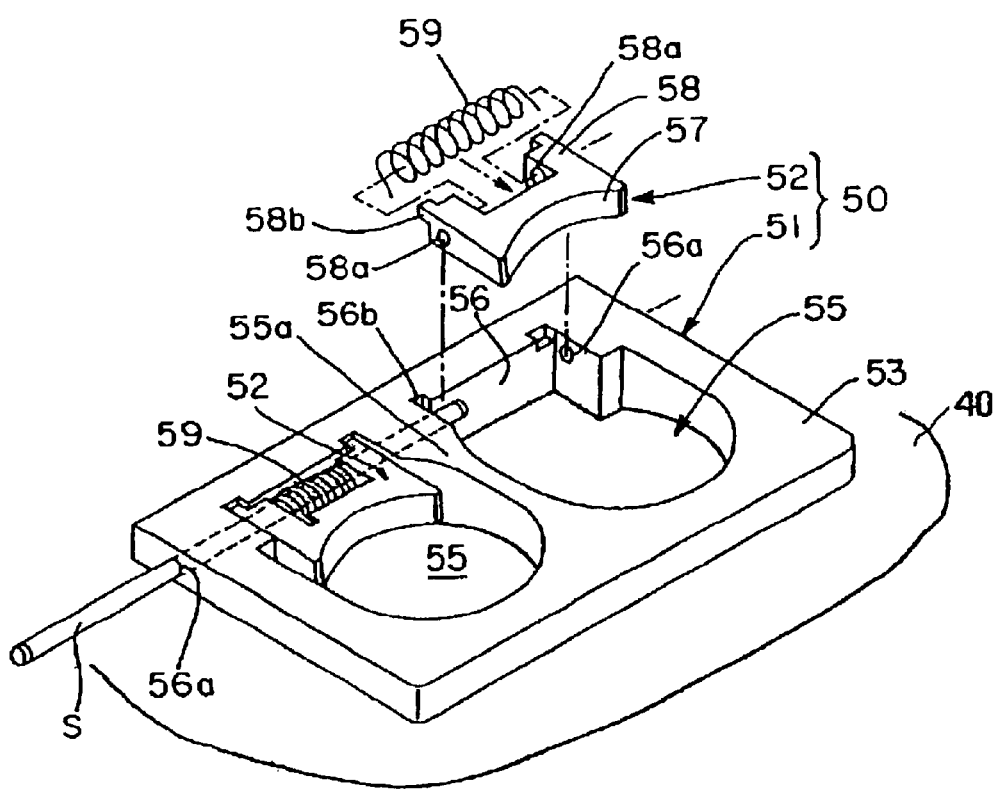
FIG. 5 is a perspective view showing a conventional cup holding device.

Hereunder, embodiments of the present invention will be described in detail with reference to the accompanying drawings. FIG. 1 is a partially exploded perspective view showing an appearance of a device according to the present invention. FIG. 2 is a plan view showing the device shown in FIG. 1 viewed from above. FIG. 3 is a sectional view taken along line 3—3 in FIG. 2. FIGS. 4(a) and 4(b) are views showing essential parts of the device, wherein FIG. 4(a) is a schematic view showing the essential parts and an assembly process of the device, and FIG. 4(b) is a sectional view taken along line 4(b)—4(b) in FIG. 4(a). In the following description, first, summary of the cup holding device will be explained, and then the essential parts and an operation thereof will be explained.

A cup holding device 1 includes a cup holding main frame 2 having vertical inserting holes 6; holding members 3 rotatably assembled to the holding main frame 2 through engagements between axles 8 and axle holes 13; and coil springs 10 rotatably urging the holding members 3 in one direction. The holding main frame 2 and the holding members 3 are molded resin products. Although there are two vertical inserting holes 6, it may be formed of one hole. Alternatively, the hole 6 may have a lid member for closing. Incidentally, although the cup holding device 1 of the embodiment is designed in a drawer-type and disposed with respect to a wall in a compartment of a car, such as instrument panel, the cup holding device 1 may be disposed in a part of an armrest or various consoles.

The cup holding device 1 includes the holding main frame 2 having the vertical inserting holes 6; the holding members 3 assembled to the holding main frame 2, each holding a container, which is inserted through an upper opening of the vertical inserting hole 6 in a radial direction thereof; and bottom receiving devices 20 for receiving bottoms of the containers inserted into the vertical inserting holes 6. The holding main frame 2 is formed of a substantially rectangular flat plate 4 on which the two vertical inserting holes 6 are formed in parallel. The respective vertical inserting holes 6 are connected through a communicating portion and, at the same time, are provided with notches 7 in a substantially U-shape continuously formed on one side thereof. An inner portion of each vertical inserting hole 6 is defined by substantially circular circumferential wall surfaces 6a; intermediate walls 6b corresponding to the communicating portion; and wall surfaces 7a, 7b corresponding to each of the notches 7.

Each of the vertical inserting holes 6 is provided with axles 8 projecting from the opposing wall surfaces 7a with a space therebetween in the notch 7. The respective axles 8 are positioned on a coaxial line and extend in the transverse direction. Specifically, the vertical section of the axle 8 has a substantially D or I character shape as shown in FIG. 4a, not a circular shape. The axle 8 has a horizontal thickness, i.e. a minimum width portion L1, and a vertical thickness, i.e. a maximum width portion L2. A space between the axles 8 is defined such that circular portions of the respective ends 10a, 10b of a coil spring 10 can engage the corresponding axles 8 in a compressed state on an axial line. The opposing wall surfaces 7a are provided with step portions 16 at front lower sides, respectively. Each of the step portions 16 is formed in a depressed shape opened downward for restricting an upper rotation of the holding member 3.

Each holding member 3 has a flat plate shape with a width corresponding to the notch 7, and includes a front end 11 for abutting against the side surface of the container and base portions 12 projecting backward from both sides of the front end 11. The holding member 3 includes a space 14 having a U-character shape between both base portions 12, and the coil spring 10 is disposed therein. An end surface 11a of the front end 11 is formed in a substantially depressed circular arc shape. Each of the base portions 12 includes an axle hole 13 corresponding to the axle 8. Each side surface of the base portion 12 is provided with a rotation restricting projection 17 corresponding to the step portion 16.

Each of the axle holes 13 includes an introduction opening 13a and an engaging hole 13b communicating with the opening 13a. The opening 13a opens at an end surface of the base portion 12 to form a narrow groove, so that when the opening 13a is viewed from the side surface, it looks like a thin slit. Then, when the holding member 3 is pressed against the axles 8 in a state at a right side in FIG. 1, the axles 8 do not pass through the openings 13a. When the holding member 3 is pressed against the axles 8 in a state shown in FIG. 4(a), the axles 8 can pass through the openings 13a and enter into the engagement holes 13b. Each of the engagement holes 13b is formed at an inner position relative to the opening 13a and has a dimension larger than the opening 13a. Further, the engagement hole 13b has a substantially circular shape to be rotatably engaged with the axles 8.

The bottom receiving device 20 includes a receiving plate 18 positioned under the two vertical inserting holes 6, and a pair of links 19 provided at both sides of the holding main frame 2 for supporting the receiving plate 18. Each of the links 19 is formed of two members disposed in an X-character shape, and lower halves of the respective members include guide grooves 19a. Upper ends of each link 19 are rotatably attached to a lower level difference portion 4a of an upper plate 4 through pins 20a, respectively. Lower ends of the links 19 are connected to the receiving plate 18 in a state where the respective pins 20b projecting from corresponding end surface of the receiving plate 18 engage the guiding grooves 19a to slide therein. Therefore, in the structure, the receiving plate 18 can stay under the upper plate 4 through the pair of the links 19 at both sides, and when necessary, it can be drawn out to a position in use as shown in FIG. 1.

With the above-described structure, each of the holding members 3 is attached to the notch 7 of the flat plate 4 together with the coil spring 10. In the process, for example, after both ends of the coil spring 10 are engaged with both axles 8 as described above, the opening 13a is oriented upward as shown in FIG. 4(a) to face the axles 8, and then the holding member 3 is lifted upward. Thus, the axles 8 enter the engaging holes 13b through the openings 13a. Incidentally, in a case that the coil spring 10 has a length corresponding to that of the notch 7 as shown in FIG. 4(b), the holding member 3 is moved upward in a state where the coil spring 10 is received in the space 14 by compressing in an axial direction.

Next, after the other end 10b of the coil spring 10 is engaged with a lower surface side of the corresponding front end 11, the holding member 3 is rotated upward around the axles 8 as a pivot. In the rotation, when the holding member 3 is rotated by substantially 90 degrees from a state facing downward, the projections 17 abut against the step portions 16 to engage therewith. From the state, while allowing the coil spring 10 to generate an urging force, one end 10a of the coil spring 10 is engaged with the corresponding portion on the side of the upper plate 4. FIG. 2 shows a state wherein the holding members 3 are attached to the holding main frame 2 as described above.

The holding members 3 as described above are positioned horizontally by the urging forces of the coil springs 10, and are largely projected into the vertical inserting holes 6 from the side of the notches 7. When a container C1 or C2 is inserted into the vertical inserting hole 6, the holding member 3 allows the container to be inserted while rotating downward against the urging force of the coil spring 10, and abuts against the side surface of the container in an inclined state corresponding to an outer diameter of the container to thereby sandwich the container between the opposed side surfaces by pressing from a radial direction of the container.

These operations are the same as those in the prior art. However, in the structure of the invention, since the axles 8 are integrally formed with the holding main frame 2, the number of constituting members is reduced. Moreover, due to the structure of the axles 8 and the axle holes 13, the present invention has good assembly workability, thereby reducing a production cost. Also, in the structure of the invention, the rotation restricting devices (the projections 17 and step portions 16) for restricting the upward rotation of the holding member 3 are invisible from outside, thereby improving an appearance of the cup holding device.

Incidentally, the above-described embodiment is just an example of the present invention, and the present invention may be modified in various ways. For example, although the holding member 3 is disposed in each of the vertical inserting holes 6, two holding members may be disposed to face each other. Also, the vertical inserting hole 6 and holding member 3 may be formed in any shape.

As described above, the cup holding device according to the present invention includes the holding main frame with the vertical inserting holes; the holding members rotatably assembled to the holding main frame; and the urging springs for rotatably urging the holding members. Accordingly, the assembly process of the holding members and the urging springs with respect to the holding main frame can be improved. Further, the number of the parts is reduced, and the production cost thereof can be greatly reduced by simplifying the part management.

While the invention has been explained with reference to the specific embodiments of the invention, the explanation is illustrative and the invention is limited only by the appended claims.

What is claimed is:

1. A cup holding device for holding a container, comprising:
   a holding main frame having at least one vertical inserting hole,
   at least one holding member rotatably attached to the holding main frame,
   at least one urging spring for rotatably urging the holding member so that the holding member supports the container inserted into the vertical inserting hole,
   a pair of axles disposed on the holding main frame with a space therebetween and having a non-circular vertical section, and
   a pair of axle holes disposed on the holding member for receiving the pair of the axles therein, each of said axle holes including an introducing opening for allowing one of the axles to be inserted therein in a specific angle, and an engaging hole portion communicating with the introducing opening for receiving the one of the axles passing through the introducing opening, said engaging hole rotatably supporting the one of the axles while preventing the one of the axles from coming off when the holding member is rotated therein for more than the specific angle.

2. The cup holding device according to claim 1, wherein said holding member includes a front end for abutting against a side surface of the container, and base portions extending in a direction away from the front end and located at two lateral sides thereof, said base portions having the pair of the axle holes, said urging spring being disposed between the base portions in a state where the pair of the axles engages the pair of the axle holes.

3. The cup holding device according to claim 1, wherein said holding member is arranged such that the holding member in the vertical inserting hole is rotatable downward from a substantially horizontal position, and said pair of the axles does not come out from the engaging hole portions when the holding member rotates to the horizontal position from a state that the pair of the axles engages the engaging hole portions when inserted through the introducing openings.

4. The cup holding device according to claim 3, wherein said non-circular vertical section of each of the axles has a first length and a second length longer than the first length.

5. The cup holding device according to claim 4, wherein said introducing opening is formed of a slit having an opening smaller than the second length and greater than the first length, and said engaging hole has a diameter greater than the second length.

6. The cup holding device according to claim 1, wherein said holding member further includes a pair of projections disposed on side surfaces thereof for preventing the holding member from rotating upward.

* * * * *